US007941182B2

(12) United States Patent
Ferro et al.

(10) Patent No.: US 7,941,182 B2
(45) Date of Patent: May 10, 2011

(54) SECURITY CELLULAR RADIO ACTIVATION AND REGISTRATION VIA SMS

(75) Inventors: Philip J. Ferro, Setauket, NY (US); Chris Coleman, Centerreach, NY (US); William R. Blum, Huntinton Station, NY (US)

(73) Assignee: Honeywell International Inc., Morristown, NJ (US)

( * ) Notice: Subject to any disclaimer, the term of this patent is extended or adjusted under 35 U.S.C. 154(b) by 726 days.

(21) Appl. No.: 11/966,372

(22) Filed: Dec. 28, 2007

(65) Prior Publication Data

US 2009/0170471 A1    Jul. 2, 2009

(51) Int. Cl.
*H04M 1/00* (2006.01)
(52) U.S. Cl. .................. 455/556.2; 455/567; 701/200
(58) Field of Classification Search .......... None
See application file for complete search history.

(56) References Cited

U.S. PATENT DOCUMENTS

| 6,819,945 | B1* | 11/2004 | Chow et al. | 455/567 |
| 2007/0293275 | A1* | 12/2007 | Kalinichenko et al. | 455/567 |
| 2009/0131107 | A1* | 5/2009 | Sasaki | 455/556.2 |
| 2010/0235476 | A1* | 9/2010 | Lin et al. | 709/219 |

* cited by examiner

*Primary Examiner* — Phuoc Doan
(74) *Attorney, Agent, or Firm* — Husch Blackwell

(57) ABSTRACT

A system and method for activating and registering a security system with a cellular provider using SMS messages is provided. The SMS messages used for activating and registering the security system are generated in a format that is predetermined by the processing station in order to provide a uniform structure for presenting the necessary information required for the specified function, i.e., activation or registration. The use of a uniform structure for the SMS allows the message to be processed entirely by a computer thus reducing cost, delay and error from having the information entered manually by a technician.

18 Claims, 2 Drawing Sheets

SECURITY CELLULAR RADIO ACTIVATION AND REGISTRATION VIA SMS

I. FIELD OF THE INVENTION

Figure 1:
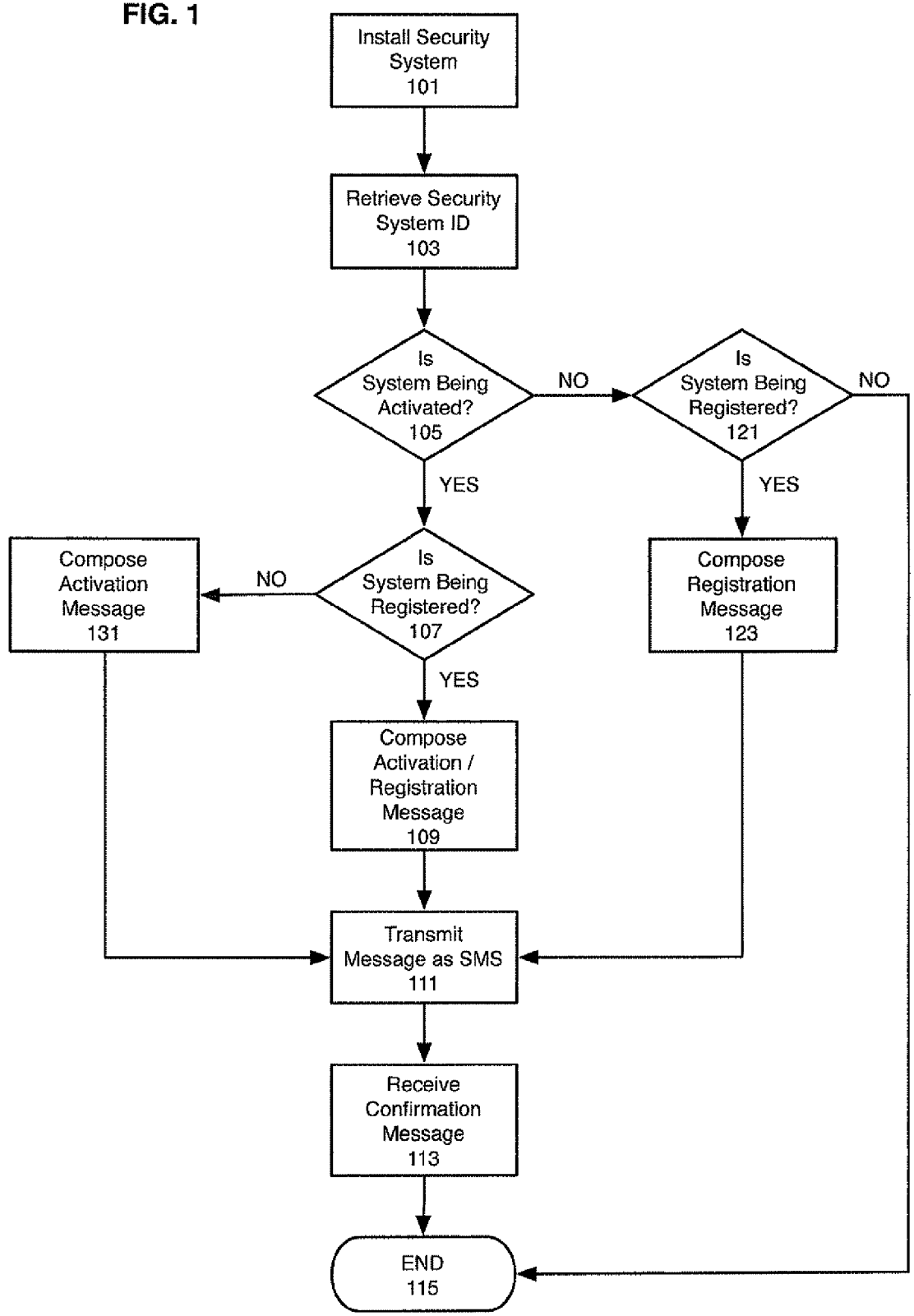

The present invention relates generally to security systems and more particularly to activation and registration of a security system using short messaging system (SMS).

II. BACKGROUND OF THE DISCLOSURE

Security systems are often connected to central monitoring station using cellular radio through a cellular provider. Cellular radio provides certain benefits over a landline telephone connection between the security system and central monitoring station, for example while landlines can be interrupted or disabled, cellular radio connections are significantly more difficult to defeat.

At the time of installation, the cellular radio of the security system must be activated with the cellular provider and registered with the security provider, such as AlarmNet/Honeywell in order for the security system to be able to communicate with the central monitoring station. Typically, this requires that a security technician contact the cellular provider by telephone and provide the necessary information to the cellular provider. However, this process can be time consuming and may lead to errors due to misunderstood information such as security system identification number, etc.

The security provider, as used with respect to the present invention, is a processing station that acts as an intermediary between the cellular radio of the security system and the central monitoring station, receiving transmissions sent by the cellular radio via the cellular provider and forward the message contained within the transmission to the central monitoring station. AlarmNet is one such intermediary, however other systems that perform a similar function are envisioned as providing the role of security provider as defined in the present invention. In addition, the processing station need not be remote from the cellular provider as the cellular provider can be adapted to act as the processing station.

III. SUMMARY OF THE DISCLOSURE

An object of the present invention is to provide a streamlined activation and registration process, which reduces activation/registration time and reduces occurrences of error due to manual input of the activation and registration information by a technician at the cellular provider or security provider.

An embodiment of the present invention for activating and registering a security system with a cellular provider includes a security system having a cellular radio transceiver; a second cellular radio transceiver carried by a security system installer capable of transmitting and receiving SMS messages in a predefined format containing at least one instruction and corresponding information; a cellular provider for receiving the SMS messages and processing the predefined format to retrieve and execute the at least one instruction; and a central monitoring station in communication with the security system via said cellular provider.

Another embodiment of the present invention is a method for activating a cellular radio with a cellular provider. The method includes the steps of composing an SMS message in a predefined format containing an activation instruction and corresponding information for activating the cellular radio; transmitting the SMS message to a processing station by way of a cellular provider; processing the SMS message received by the processing station to extract at least the activation instruction and the corresponding information; and performing the activation instruction using the corresponding information.

Yet another embodiment of the present invention is a method for activating a cellular radio with a cellular provider and registering said cellular radio with a security provider. The method includes the steps of composing an SMS message in a predefined format containing at least an activation instruction and a registration instruction and corresponding information for activating and registering the cellular radio; transmitting the SMS message to a security provider; processing the SMS message received by the cellular provider to extract the activation instruction and the registration instruction and the corresponding information; and performing at least the activation instruction and the registration instruction using the corresponding information.

The SMS messages used for activating and registering the security system with the cellular provider and security provider, respectively, are generated in a format that is predetermined by the security provider in order to provide a uniform structure for presenting the necessary information required for the specified function, i.e., activation or registration. The use of a uniform structure for the SMS allows the message to be processed entirely by a computer thus reducing cost, delay and error from having the information entered manually by a technician at either the cellular provider or security provider.

Moreover, a method is disclosed for activating a security system with a cellular provider and registering the security system with a security provider. The method includes the steps of composing a message in a predefined format containing at least one instruction and corresponding information; transmitting the message to a cellular provider using SMS protocol; and receiving a confirmation message from the cellular provider upon successful completion of the at least one instruction.

IV. BRIEF DESCRIPTION OF THE DRAWINGS

Figure 2:
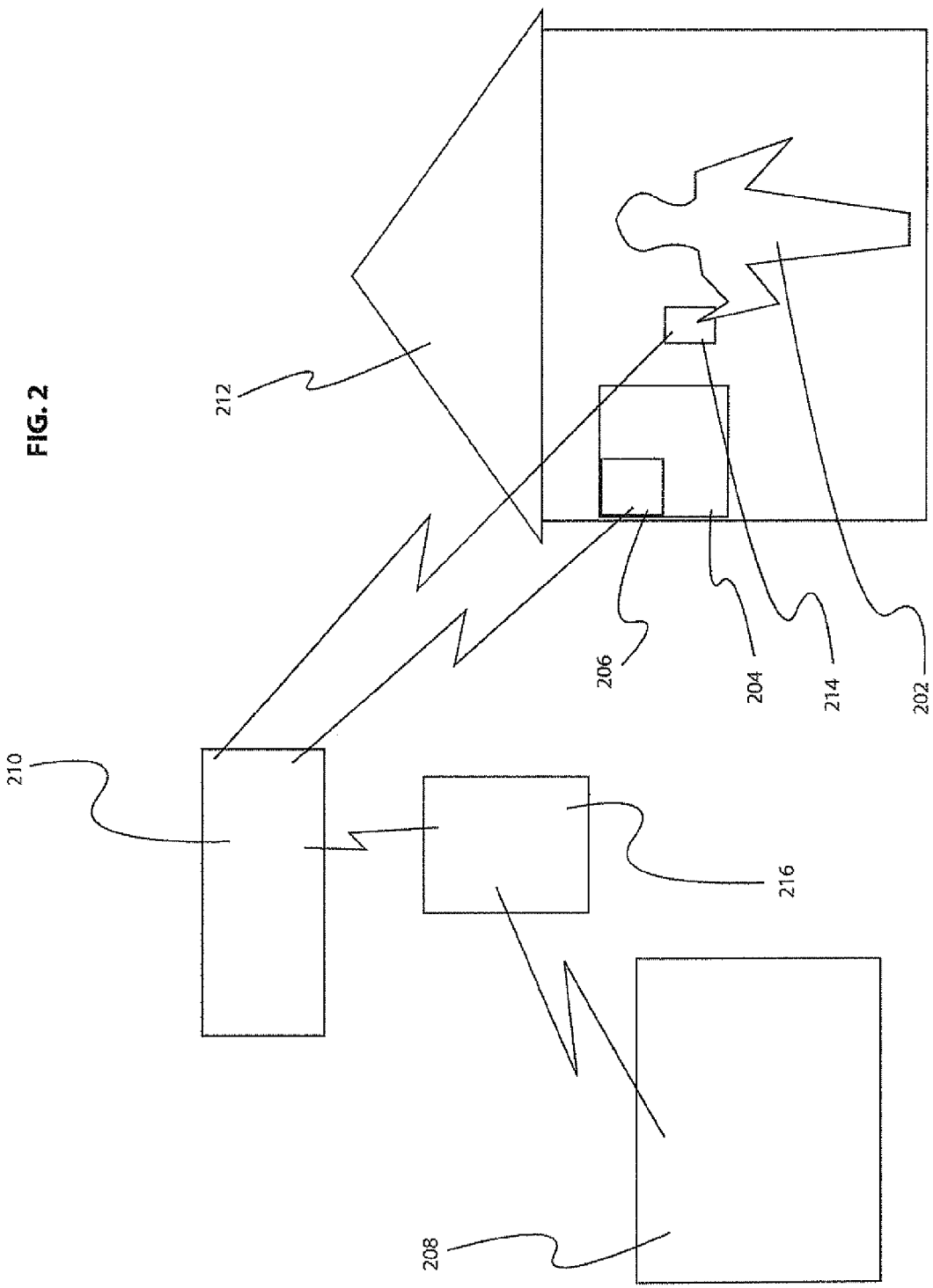

These and other features, aspects, and advantages of the present invention will become better understood with regard to the following description, appended claims, and accompanying drawings wherein:

FIG. 1 illustrates a flow diagram of the process for performing an embodiment of the present invention; and FIG. 2 illustrates a representation of a security system installation in accordance with an embodiment of the present invention.

V. DETAILED DESCRIPTION OF DISCLOSURE

Referring to FIG. 1, a security system technician installs a security system in step 101. Upon completion of the installation, the technician retrieves an identification code identifying the installed system such, as a serial number or MAC address, in step 103.

Moving on to step 105, the technician determines whether the installed system needs activation. If the system requires activation, the technician determines if the system requires registration as well in step 107. Otherwise, if the system does not need activation, the technician must still determine if the system requires registration in step 121.

In the case where both activation and registration of the installed system are required, the technician proceeds to step 109, where an SMS message is composed. The SMS message conforms to a predetermined format so that the information and instructions can be easily parsed by an automated activation/registration system at a processing station (i.e., security provider, cellular provider, etc.). For example, an SMS message for activation and registration can be structured as follows: instruction code, city code, central station code, subscriber code, MAC, cyclic redundancy check (CRC), supervision rate, mode. Thus, a complete SMS message for activation and registration would be: ACTREG 89 05 6800 00DD02D0025A7 23F2 DAILY ECP.

In the above example the CRC is a unique code assigned by the security system manufacturer. The CRC is linked to the MAC address such that any mistake in entering either the MAC address or CRC would be detectable during the activation and registration process. Thus, the use of both the MAC address and CRC provides insurance against erroneous identification of the security system due to mistyping or illegibility of either sequence. However, any unique identifier may be used as well, such as a serial number. Alternatively, the present invention can be implemented without a redundancy check.

In the case where only activation of the security system is required, the SMS message composed in step 131 would be: ACT 00DD02D0025A7 23F2, i.e. the instruction code: ACT, the MAC address and CRC. While in the case where only registration is required, the SMS message composed in step 123 would be: REG 89 05 6800 00DD02D0025A7 23F2 DAILY ECP, i.e. the instruction code: REG, city code, central station code, subscriber code, MAC address, CRC, supervision rate and mode. The different information contained in the SMS messages depend on the particular function being performed and the information required for the proper completion of the function.

Additionally, instruction codes can be created for performing other functions such as deactivation of a security system, change of supervision rate, etc. Moreover, the various codes provided above are not intended to limit the present invention to those codes alone or to one particular format. Rather, codes may be numerical, alphanumerical, or any other representation. The format of the SMS message is also not limited to the format described above, any format that provides the necessary information in a structured form can be predefined by either the security provider.

Continuing onto step 111, the composed SMS message is transmitted to the processing station. Once the SMS message is received by the processing station and verified to be in the correct format, the processing station performs the specified functions (i.e., activation, registration, or both). Upon completion of the specified functions, the processing station transmits a confirmation SMS message, which is received by the technician in step 113, confirming successful completion of the functions. The confirmation SMS message can contain status information regarding the specified functions as well as additional information useful to the technician. With the confirmation SMS message received by the technician, the installation of the security system is completed and the process proceeds to step 115.

Turning to FIG. 2, an implementation of an embodiment of the present invention is shown. A security system installer 202 installs a security system 204 that is equipped with a cellular radio transceiver 206 for communicating with a central station 208 via a cellular provider 210. The security system is disposed at a location inside a residence or commercial building 212.

Upon completion of the installation, the security system installer 202, using a SMS messaging enabled cellular telephone 214, prepares an SMS message to the processing station 216, which the processing station 210 receives by way of the cellular provider 210. The SMS message is formatted as described above in reference to FIG. 1 and contains the relevant information for activating and/or registering the newly installed security system 204. The processing station 216 forwards the activation information to the cellular provider 210, while registration information is forwarded to a registration unit (not shown), such as a database, which may or may not be a component of the processing station 216. Once activated and registered, the installed security system 204 will be able to communicate with the central monitoring station 208.

It should be noted that while the present invention is described with respect to activating and registering a security system, the present invention is not limited to only this application. Rather, the present invention is applicable to any product or system that requires activation with a cellular provider.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A method for activating a cellular radio with a cellular provider, said method comprising:
composing an SMS message in a predefined format, wherein composing the SMS message includes inputting the SMS message containing an activation instruction and corresponding information for activating said cellular radio;
transmitting said SMS message to a processing station;
the processing station processing said SMS message received by said processing station to extract at least said activation instruction and said corresponding information from said received SMS message; and
the processing station performing said activation instruction using said corresponding information.

2. The method as in claim 1, further comprising a registration instruction for registering said cellular radio.

3. The method as in claim 1, further comprising receiving a confirmation message from said cellular provider upon successful completion of said activation instruction.

4. The method as in claim 1, wherein said corresponding information includes an identifier for identifying said cellular radio.

5. The method as in claim 4, wherein said identifier is a MAC address.

6. The method as in claim 1, wherein said cellular radio is a component of a security system and used to provide a communication link between said security system and a central monitoring station by way of said cellular provider.

7. The method as in claim 6, further comprising receiving a confirmation message from said cellular provider upon successful completion of said activation instruction and said registration instruction.

8. The method as in claim 7, wherein said identifier is a MAC address.

9. The method as in claim 6, wherein said corresponding information includes an identifier for identifying said cellular radio.

10. The method as in claim 6, wherein said cellular radio is a component of a security system and used to provide a communication link between said security system and a central monitoring station by way of said cellular provider.

11. A method for activating a cellular radio with a cellular provider and registering said cellular radio, said method comprising:

composing an SMS message in a predefined format, wherein composing the SMS message includes inputting the SMS message containing at least an activation instruction and a registration instruction and corresponding information for activating and registering said cellular radio;

transmitting said SMS message to a processing station;

the processing station processing said SMS message received by said processing station to extract said activation instruction and said registration instruction and said corresponding information from said received SMS message; and the processing station performing at least said activation instruction and said registration instruction using said corresponding information.

12. A method for activating a security system with a cellular provider and registering said security system with a security provider, said method comprising:

composing an SMS message in a predefined format, wherein composing the SMS message includes inputting the SMS message containing at least one instruction selected from the group of instructions including activation and registration, and corresponding information;

transmitting said SMS message to a security provider;

the processing station processing said SMS message received by said cellular provider to extract said at least one instruction and said corresponding information from said received SMS message; and the processing station performing said at least one instruction using said corresponding information.

13. The method as in claim 12, further comprising receiving a confirmation message from said cellular provider upon successful completion of said at least said activation instruction.

14. The method as in claim 12, wherein said corresponding information includes a security system identifier for identifying said security system to a central monitoring station.

15. The method as in claim 14, wherein said security system identifier is a MAC address.

16. A system for activating and registering a security system with a cellular provider, said system comprising:

cellular radio in communication with a security system;

a second cellular radio transceiver carried by a security system installer, the second cellular radio transceiver capable of transmitting inputted SMS messages in a predefined format, the SMS messages containing at least one instruction selected from the group of instructions including activation and registration, and the SMS messages containing corresponding information; and a controller for receiving said SMS messages and processing said SMS messages to retrieve said at least one instruction and said corresponding information from said SMS messages and execute said at least one instruction.

17. The system as in claim 16, wherein said corresponding information includes a security system identifier for identifying said security system to a central monitoring station.

18. The system as in claim 17, wherein said security system identifier is a MAC address.

* * * * *